United States Patent [19]
Huh

[11] Patent Number: 5,650,924
[45] Date of Patent: Jul. 22, 1997

[54] ELECTRIC POWER SUPPLY DEVICE FOR A MONITOR

[75] Inventor: Dong-Young Huh, Kyeonggi-Do, Rep. of Korea

[73] Assignee: Daewoo Electronics Co., Ltd., Seoul, Rep. of Korea

[21] Appl. No.: 624,220

[22] Filed: Mar. 29, 1996

[30]   Foreign Application Priority Data

Mar. 31, 1995 [KR] Rep. of Korea ............... 95-7201
Mar. 31, 1995 [KR] Rep. of Korea ............... 95-7202

[51] Int. Cl.$^6$ .................................................. H02M 7/217
[52] U.S. Cl. ........................................ 363/127; 323/349
[58] Field of Search ............................ 323/349; 363/127

[56]          References Cited

U.S. PATENT DOCUMENTS

| | | | |
|---|---|---|---|
| 4,794,507 | 12/1988 | Cavigelli | 363/86 |
| 5,119,285 | 6/1992 | Liu et al. | 363/127 |
| 5,254,937 | 10/1993 | Mizoguchi | 323/349 |

*Primary Examiner*—Stuart N. Hecker
*Attorney, Agent, or Firm*—Beveridge, DeGrandi, Weilacher & Young, LLP

[57]         ABSTRACT

Disclosed is an electric power supply device having minimized power consumption during an off-mode of a monitor. The present invention has an electric power input unit including a bridge diode for outputting an output signal by rectifying an alternate electric signal supplied from the external, a switch for switching to pass the first signal, and a capacitor for rectifying the first signal of the bridge diode and supplying the rectified first signal to a primary winding of a transformer; an electric power economizer for generating a switching signal in order to control the switch according to presence or non-presence of a synchronizing signal inputted from the external, and for preventing the transformer from being operated by switching the switch to a turn-off state during an off-mode of the monitor; and an electric power supplier for rectifying induced signals of one or more secondary windings of the transformer, and for stabilizing the rectified induced signals to supply the stabilized and rectified induced signals to one or more loads. With the present invention, consumption of electric power can be minimized since during an off-mode of a monitor a transformer is disabled.

15 Claims, 8 Drawing Sheets

ELECTRIC POWER SUPPLY DEVICE FOR A MONITOR

BACKGROUND OF THE INVENTION

1. Field of the Invention

The present invention relates to an electric power supply device for a monitor, particularly to a power supply device which can reduce power consumption of a monitor when a synchronizing signal is not inputted.

2. Description of the Prior Art

Figure 1:
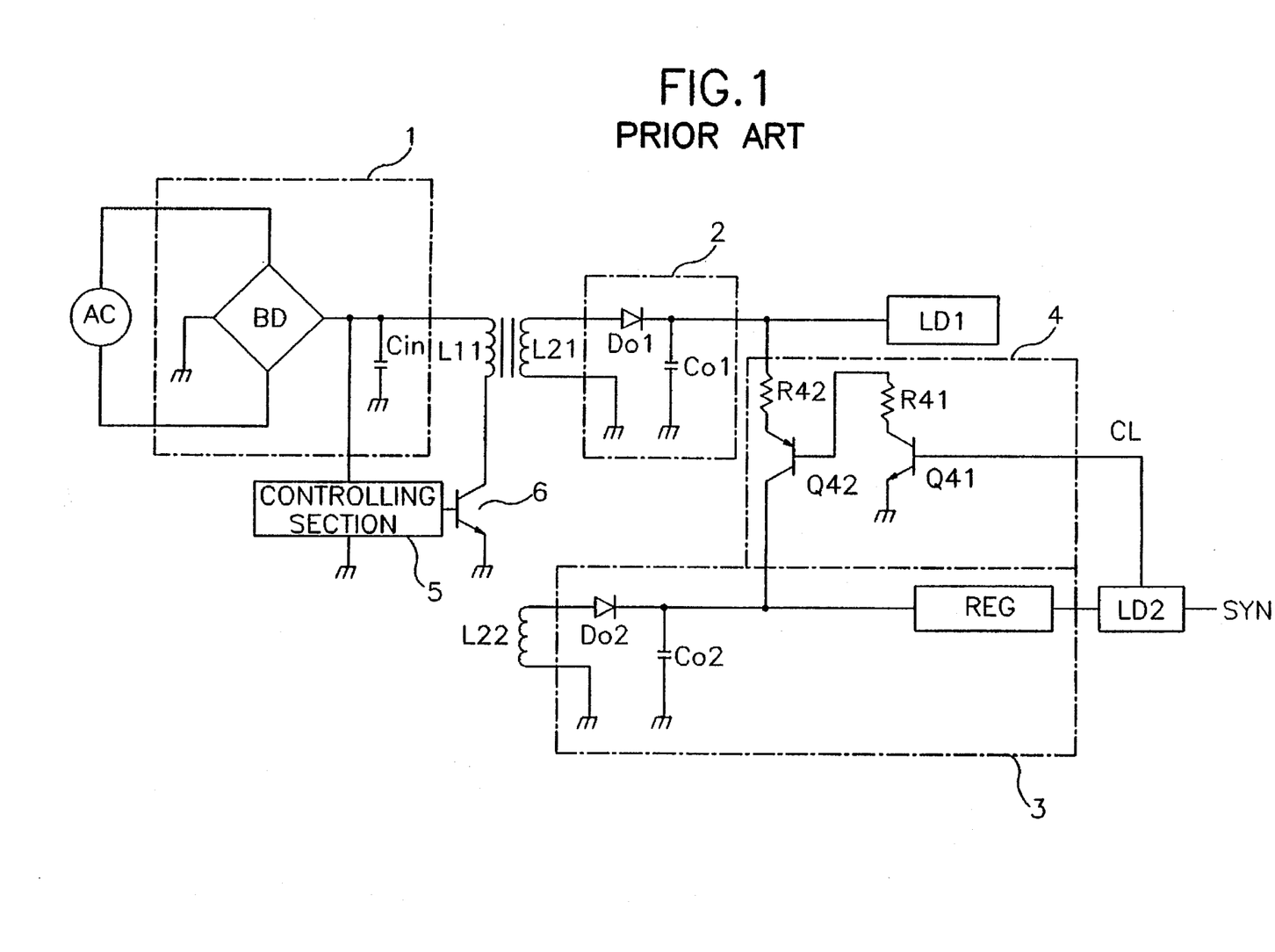
FIG. 1 is a circuit diagram of a conventional power supply device of a monitor.

A power supply device of a monitor is a device which converts an alternating current AC inputted from outside into a direct current DC which is then loaded to a microprocessor, a video processor, a heater, etc. A conventional power supply device of a monitior is shown in FIG. 1. In FIG. 1, reference numeral 1 refers to an electric power source at which an alternating current inputted from outside is subject to full-wave rectification and smoothing, and is supplied to a primary winding L11 of a transformer T; reference numeral 2 refers to a first power supply section at which an excitation voltage of a first secondary winding L21 of the transformer T is subject to half-wave rectification and smoothing, and is supplied to a first load LD1; reference numeral 3 refers to a second power supply section at which an excitation voltage of a second secondary winding L22 of the transformer T is subject to half-wave rectification and smoothing, and is supplied to a second load LD2; reference numeral 4 refers to a power economy section at which a mode switching signal CL is generated according to the presence of a synchronizing signal inputted from outside, and an output voltage Vo1 of a first power supply section 2 is supplied to a second power supply section 3 according to a mode switching signal CL; reference numeral 5 refers to a control section at which a control signal, which is initiated by an output voltage of the electric power source 1 for allowing flow of a current through the primary winding L11 of the transformer T, is generated, and the control signal is varied according to a current supplied from outside; and finally, reference numeral 6 refers to a switching section, which is switched according to a control signal of the control section 5 to control the current flowing through the primary winding L11 of the transformer T, and which includes a transistor for switching.

In a power supply device of a monitor as described above, to an output terminal of a bridge diode BD of the electric power source 1 at which an inputted alternating current is rectified, an input terminal of a capacitor Cin at which an output voltage of the bridge diode BD is smoothed and supplied to the primary winding L11 of the transformer T is connected. Another terminal of the capacitor cin is connected to earth.

To one end of the first secondary winding L21 of the transformer T, anode of a diode Do1 of the first power supply section 2 for rectifying an excitation voltage of the first secondary winding L21 of the transformer T is connected; to cathode of the diode Do1, one end of the capacitor Co1 for smoothing the output voltage of the diode Do1 is connected; and another end of the capacitor Co1 as well as another end of the first secondary winding L21 of the transformer T are connected to ground.

Further, one end of the secondary winding L22 of the transformer T is connected to anode of the diode Do2 of the second power supply section 3 at which an excitation voltage of the second secondary winding L22 of the transformer T is subject to half-wave rectification; to cathode of the diode Do2, one end of the capacitor Co2 at which the output voltage of the diode Do2 is smoothed and supplied to the second load LD2; and another end of the capacitor Co2 is connected to one end of a regulator at which the output voltage of the capacitor Co2 is regulated to be a constant voltage. Another end of the second secondary winding L22 of the transformer T is connected to ground.

In the meantime, an output terminal of the second load LD2 is connected to a base terminal of a transistor Q41 of the power economy section 4 to switch a mode swithing signal CL ouputted from the second load LD2; to a collector of the transistor Q41, an output terminal of a resistance R41 for controlling an output voltage of the transistor Q41 is connected; and an emitter of the transistor Q41 is connected to ground.

An input terminal of a resistance R41 is connected to a base terminal of the transistor Q42; an emitter of the transistor Q42 is connected to an output terminal of a resistance R42; and a collector of the transistor Q42 is connected to an input terminal of a regulator REG of the second power supply section 3. An input terminal of the resistance R42 is connected to an output terminal of the first power supply section 2.

In a power supply device of a monitor as described above, an alternating current AC inputted from outside is supplied to a bridge diode BD of the electric power source 1 and is subject to full-wave rectification. An output voltage of the bridge diode BD is supplied to the capacitor Cin and smoothed. An output voltage of the capacitor Cin is supplied to the primary winding L11 of the transformer T.

In the meantime, an output voltage of the bridge diode BD is suppled to a control section 5 at which a control signal is generated and supplied to a switching section 6. The switching section 6 is switched to a turn-on state. Then a current flows through the primary winding L11 of the transformer T, and the first secondary winding L21 and the second secondary winding L22 of the transformer T are excited. At this time, the magnitudes of the excitation voltages of the first secondary winding L21 and the second secondary winding L22 of the transformer T are determined according to the turn ratio of the first secondary winding L21 and the second secondary winding L22.

Further, an excitation voltage of the first secondary winding L21 of the transformer T is supplied to a diode Do1 of the first power supply section 2, after which the excitation voltage of the first secondary winding L21 of the transformer T is rectified at the diode Do1. An output voltage of the diode Do1 is supplied to a capacitor Co1 at which an output voltage of the diode Do1 is smoothed, and an output voltage of the capacitor Co1 is supplied to the first load LD1. The first load LD1 is then operated.

In the meantime, an excitation voltage of the second secondary winding L22 is supplied to a diode Do2 of the second power supply section 3; an excitation voltage of the second secondary windig L22 is subject to half-wave rectification at the diode Do2; an output voltage of the diode Do2 is supplied to a capacitor Co2 at which an output voltage of the diode Do2 is smoothed. An output voltage of the capacitor Co2 is supplied to a regulator REG at which the output voltage of the capacitor Co2 is converted to be a constant voltage. An output voltage of the regulator REG is supplied to a second load LD2. The second load LD2 is then operated.

Under this circumstance, once a synchronizing signal SYN is inputted to the second load LD2 from outside, a low-potential mode switching signal CL is generated at the second load LD2 and is supplied to a transistor Q41 of a power economy section 4. The transistor Q41 is then switched to a turn-off state. Accordingly, another transistor Q42 is switched to a turn-off state, after which output voltages of the first power supply section 2 and the second power supply section 3 are supplied to the first load LD1 and the second load LD2, respectively.

However, if a synchronizing singnal SYN is not inputted from outside, a control signal of the control section 5 is varied since a voltage is supplied from outside to the control section 5 in order to stop driving of the loads except for a second load LD2 of a monitor. Therefore, the quantity of the current flowing through the primary winding L11 of the transformer T is varied, and accordingly, excitation voltages at the first secondary winding L21 and the second secondary windig L22 are reduced to about one tenth of their normal values, and the first load is not operated.

A high-potential mode switching signal CL is generated at the second load LD2, after which a transistor Q41 of a power economy section 4 is switched to a turn-on state as well as another transistor Q42. In other words, the voltage supplied from the first power supply section 2 to the first load LD1 is supplied to a regulator REG of the second power supply section 3 through the transistor Q42 of the power economy section 4, and an output voltages of the first power supply section 2 is converted to be a contant voltage at the regulator REG. The output voltage of the regulator REG is supplied to the second load LD2 of which operation is continued. That is, the operation of the second load LD2 is continued without input of a synchronizing signal SYN.

In a general power supply device of a monitor, in order to drive the second load LD2, a bridge diode BD, a capacitor Cin, and a transformer T have to maintain their operations even when no synchronizing signal SYN is inputted from outside, which leads to a problem that the power consumption of the transformer T is greater than that of the second load LD2.

SUMMARY OF THE INVENTION

Therefore, an object of the invention is to provide a power supply device of a monitor in which power consumption is minimized by blocking the current supplied into a transformer when no synchronizing signal is inputted from outside.

The power supply device of a monitor of the present invention is composed of an electric power source which includes a bridge diode for full-wave rectification of an alternating current supplied through a negative input terminal and a positive input terminal, a switch for passing output voltage of a bridge diode, and a capacitor for smoothing an output voltage of the bridge diode inputted through the switch and supplying it to a primary winding of a transformer; a power economy section for generating a switching signal to control the switch according to the presence of a synchronzing signal inputted from outside, and for stopping driving of a transformer by switching the switch to turn-off state according to the switching signal when a monitor is in an off mode; and a plurality of power supply sections for half-wave rectification, smoothing, and supplying to each load, of excitation voltages of a plurality of secondary windings of the transformer.

In a preferred embodiment of the present invention, a switching signal of a power economy section is outputted at a low level when a synchronizing signal is not inputted, a switch is switched to a turn-off state, and thus an output voltage of a bridge diode is not supplied to a capacitor. As a current does not flow through a primary winding of a transformer, excitation voltages of a plurality of secondary windings of a transformer are eliminated. The driving of the trasnformer is thus stopped, the loads are not operated, and minimization of power consumption can be achieved.

BRIEF DESCRIPTION OF THE DRAWINGS

The foregoing and other objects, aspects and advantages will be better understood from the following detailed description of a preferred embodiment of the invention with reference to the drawings, in which:

FIGS. 4 a–4c are wave form diagrams of output signals of each section of FIG. 3;

DESCRIPTION OF THE PREFERRED EMBODIMENTS OF THE INVENTION

Referring now to the drawings, described is a power supply device of a monitor manufactured according to the present invention.

Figure 2:
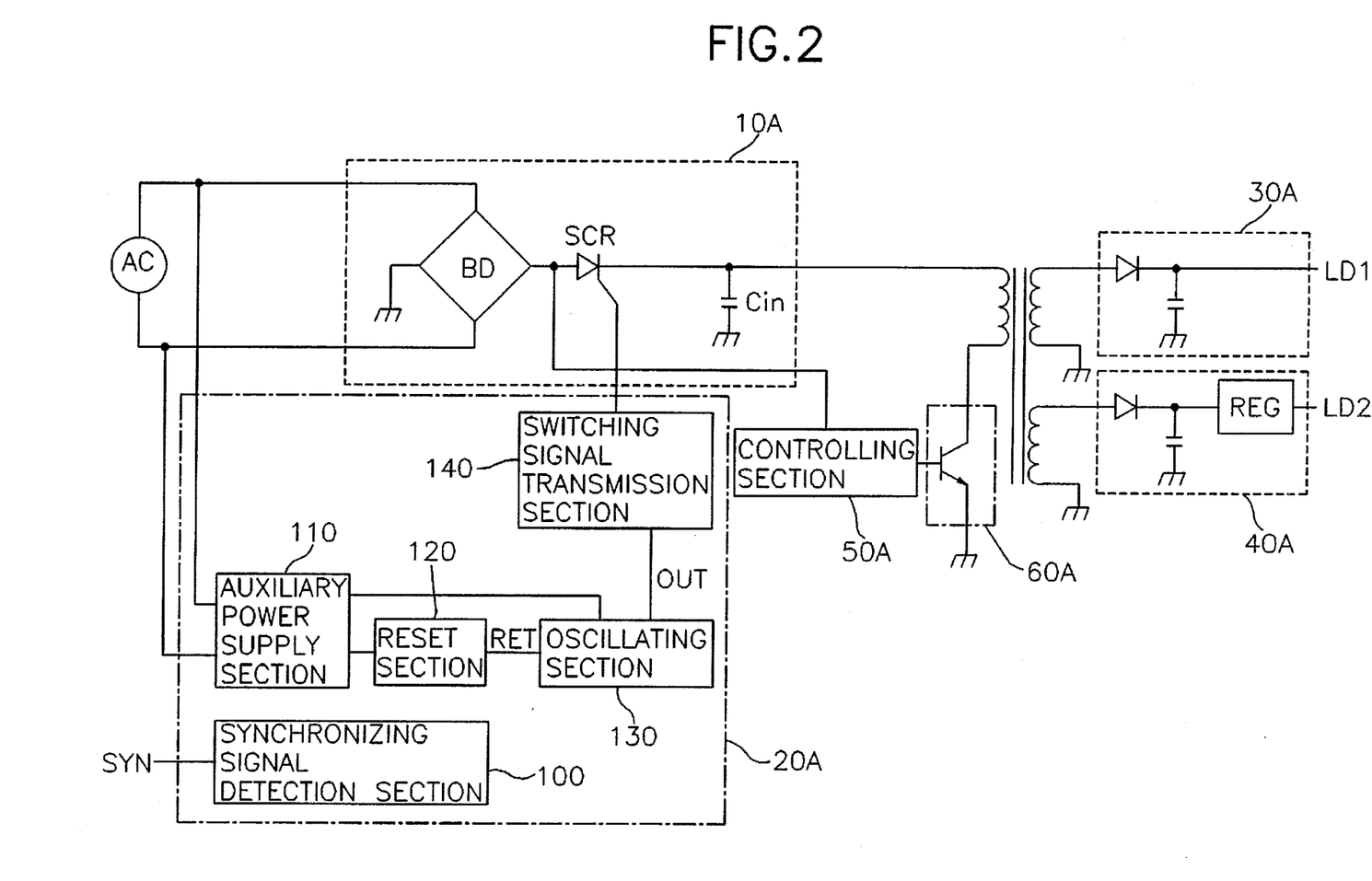
FIG. 2 is a circuit diagram of a power supply device of a monitor manufactured according to a first embodiment of the present invention.
Figure 3:
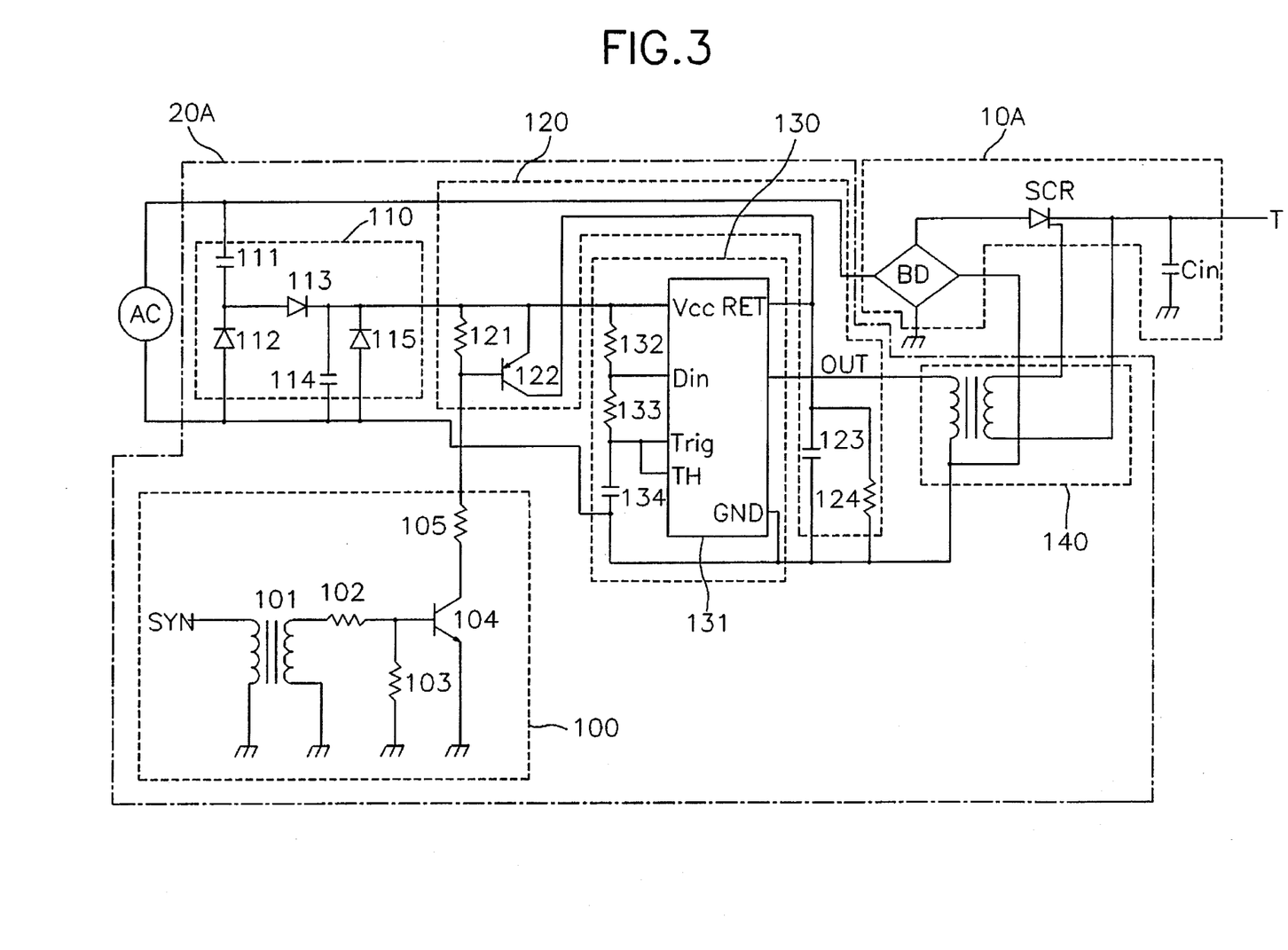
FIG. 3 is a detailed circuit diagram of an electric power source and a power economy section of a power supply device of a monitor shown in FIG. 2.

In FIGS. 2 and 3, reference numeral 10A refers to an electric power source which includes a bridge diode BD for full-wave rectification of an alternating current AC supplied from a negative input terminal and a positive input terminal, a switch SCR for passing through an output voltage of the bridge diode BD and a capacitor Cin for smoothing an output voltage from the switch SCR and supplying it to the primary winding of the transformer T. Reference numeral 2OA refers to a power economy section for generating a switching signal OUT to control the switch SCR according to the presence of a synchronizing signal SYN outputted from outside. Reference numeral 30A refers to a first power supply section for half-wave rectification and smoothing of an excitation voltage of a first secondary winding L21 of the transformer T and supplying it to the first load LD1. Reference numeral 40A refers to a second power supply section for half-wave rectification and smoothing of an excitation voltage of a second secondary winding L22 of the transformer T and supplying it to the second load LD2. Reference numeral 50A is a control section, for generating a control signal which is initially driven by an output voltage of a bridge diode BD of the eletric power source and allows flow of a current through the primary winding L11 of the transformer T, and for varying the control signal according to a current inputted from outside. Reference numeral 60A refers to a switching section which is comprised of a transistor, is switched according to a control signal of the control section 50A, and controls the current flowing through the primary winding L11 of the transformer T.

The power economy section 20A is comprised of a synchronizing signal detection section 100 for detecting the presence of a synchronizing signal inputted, an auxiliary power supply section 110 for converting an alternating current to a direct current, a reset section 120 for generating a driving signal RET to generate a switching signal according to an output voltage of the auxiliary power supply section 110 and an output signal of the synchronizing signal detection section, an oscillation section 130 which is oscillated according to a driving signal RET of the reset section 120 to generate a switching signal OUT, and a switching signal transmission section for transmitting a switching signal OUT of the oscillation section 130 to an electric power source 10A.

FIG. 3 shows a detailed diagram of the electric power source 10A and the power economy section 4. In FIG. 3, to a positive input terminal of an alternating current AC and a negative input terminal, a bridge diode BD of the electric power source 20A for full-wave rectification of the alternating current AC is connected; and to an output terminal of the bridge diode BD, anode of the switch SCR which is switched according to a switching signal OUT of the switching signal transmission section 140 is connected. The switch SCR is comprised of a thyristor.

In other words, to a gate of the switch SCR, an output terminal of the switching signal transmission section 140 is connected; to anode of the switch SCR, an output terminal of the bridge diode BD is connected; and to cathode of the switch SCR, one end of a capacitor Cin for smoothing the output voltage of the bridge diode BD which has passed through the switch SCR is connected. To another end of the capacitor Cin, one end of the primary winding of the transformer T through which a current flows according to an output voltage of the capacitor Cin and switching state of the switching section 60A.

In the meantime, to one end of a secondary windig of the transformer 101 of a synchronizing signal detection section 100 which is excited according to the presence of a synchronizing signal SYN inputted from outside, resistances 102, 103 of the synchronizing signal detection section 100 are connected to distribute the excitation voltage of the secondary winding of the transformer 101. To output terminals of resistances 102, 103, a base of the transistor 104 which is switched accordig to the distribution voltage of resistances 102, 103 is connected; to a collector of the transistor 104, an output terminal of a resistance 105 for controlling the output current of the transistor 104 is connected; and the primary winding of the transformer 101, another end of the secondary winding, an emitter of the transistor 104, and an output terminal of a resistance 103 are connected to earth.

In the meantime, to a positive input terminal and a negative input terminal, one end of the capacitor 111 of an auxiliary power supply section 110 for smoothing an alternating current AC is connected. To an output terminal of the capacitor 111, cathode of a diode 112 for rectifying the output voltage of the capacitor 111 as well as anode of a diode 113 are connected; and to anode of a diode 112, a negative input terminal of an alternating current is connected.

Further, to cathode of a diode 113, one end of the capacitor 114 for smoothing the output voltage of the diode 113 is connected; and to another end of the capacitor 114, a negative input terminal of an alternating current AC is connected. To one end of the capacitor 114, anode of a Zener diode 115 for maintaining constantly the output voltage of the capacitor 114 is connected; and to another end of the capacitor 114, a negative input terminal of an alternating current AC is connected. To anode of a Zener diode 115, an input terminal of a resistance 121 of a reset section 120 for biasing an output voltage of the capacitor 114 is connected; to an output terminal of a resistance 121, a base of a transistor 122 which is switched according to switching state of a transistor 104 of a synchronizing signal detection section 100 as well as an input terminal of a resistance 105 of a synchronizing signal detection section 100 are connected.

To an emitter of a transistor 122, anode of a Zener diode 115 is connected; and to a collector of a transistor 122, one end of a capacitor 123 for charging and discharging an output voltage of a transistor 122 as well as an input terminal of a resistance for discharging the charged voltage of the capacitor 123 are connected. To output terminals of the capacitor 123 and a resistance 124, a negative input terminal of an alternating current AC is connected.

In the meantime, to a collector of a transistor 122, a capacitor 123, and an input terminal of a resistance 124, a driving signal input port of a timer 131 of an oscillation section 130 which is oscillated according to the charged voltage of a capacitor 123 is connected. To an emitter of a transistor 122, a power input port of a timer 131 which is driven by an output voltage of a transistor 122 is connected; and at the same time, a resistance 132 for determining the cycle of a switching signal OUT outputted from the timer 131, a resistance 133, and a capacitor 134 are connected in series. At this time, to an output terminal of a resistance 132, a disabling signal input port of a timer 131 is connected; to an output terminal of a resistance 133, a trigger signal input port of a timer 131 as well as a threshold input port of a timer 131 are connected. To an output terminal of a capacitor 134 and an earthing port of a timer 131, a negative input terminal of an alternating current AC is connected.

A switching signal OUT of a timer 131 is supplied to an input terminal of a switching signal transmission section 140, and to an output terminal of the switching signal transmission section 140, a negative input terminal of an alternating current AC is connected. The switching signal transmission section 140 is comprised of a transformer, and an output terminal of the switching signal transmission section 140 is connected to a gate of a switch SCR.

A first power supply section 30A connected to a first secondary winding and a second secondary winding of a transformer, a second power supply section 40A, a control section 50A, and a switching section 60A are constructed in a conventional manner.

Figures 4A, 4B:
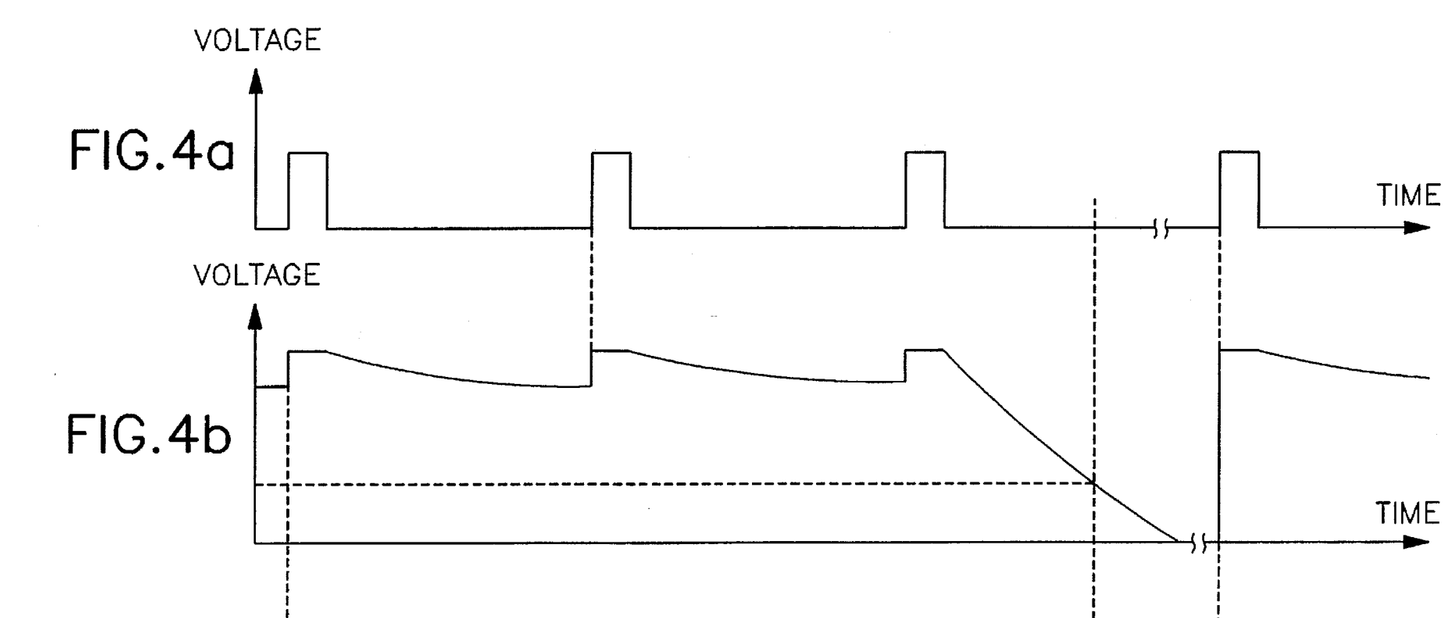
Figure 4C:
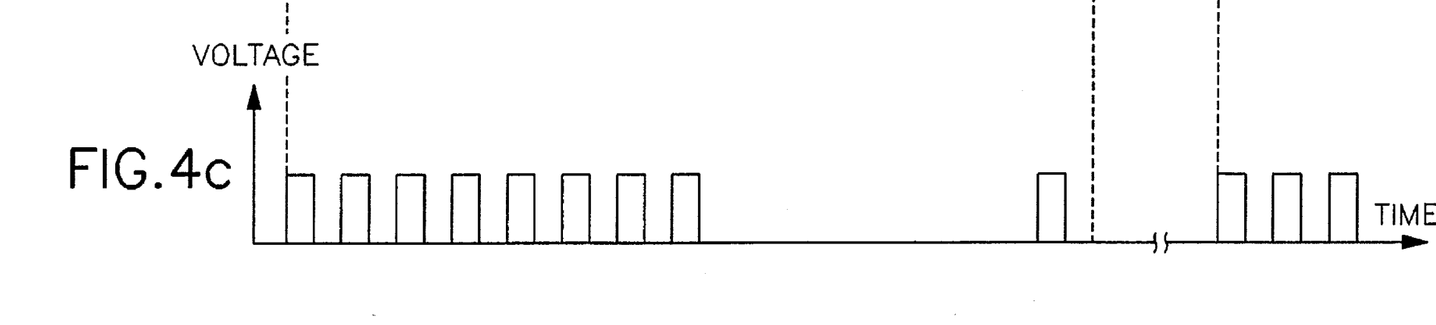

FIGS. 4a–4c show how a synchronizing signal SYN is inputted in a power supply device of a monitor constructed as described above.

An alternating current supplied from outside is supplied to a bridge diode BD of an electric power source 10A, and is subject to full-wave rectification at the bridge diode BD. An output voltage of the bridge diode is supplied to anode of a switch SCR.

As shown in FIG. 4a, once a synchronizing signal SYN is supplied to a synchronizing signal detection section 100 of a power economy section 20A, a transformer 101 is driven. Then an excitation voltage of the transformer 101 is supplied to resistances 102, 103 and is distributed. The distribution voltages of resistances 102, 103 are supplied to a base of a transistor 104 which is switched to a turn-on state accordingly.

Under this circumstance, an alternating current AC supplied through a positive input terminal and a negative input terminal is supplied to an auxiliary power supply section 110 at which the alternating current is converted to a direct current DC. That is, an alternating current AC is supplied to a capacitor 111 of an auxiliary power supply section 110, in order to be smoothed. An output voltage of the capacitor 111 is supplied to diodes 112, 113 in order to be rectified.

An output voltage of diodes 112, 113 is supplied to a capacitor 114 and is smoothed. An output voltage of the capacitor 114 is then supplied to a Zener diode 115 which maintains the charged voltage of the capacitor 114 to be constant. That is, if an output voltage of a capacitor 114 is higher than a predetermined voltage of a Zener diode 115, the Zener diode 115 is switched to a turn-on state, and the charged voltage of the capacitor 114 is maintained at the predetermined voltage of the Zener diode 115. As a transistor 104 of a synchronizing signal detection section 100 is switched to a turn-on state, the output voltage of a capacitor 114 is supplied to an emitter of the transistor 104 through a resistance 121 of a reset section 120 and a resistance 105 of a synchronizing signal detection section 100.

An output voltage of a resistance 121 is of low potential, and a transistor 122 is switched to a turn-on state as the output voltage of the resistance 121 is supplied to the transistor 122. The output voltage of the transistor 122 then becomes of high potential.

An output voltage of the transistor 122 is supplied to a capacitor 123 and is discharged. At this than, if the charged voltage of the capacitor 123 is higher than a threshold voltage, the charged voltage of the capacitor 123 is supplied to a timer 131 of an oscillation section 130. The timer 131 is then operated according to a driving signal RET outputted from the capacitor 123. The charged voltage of the capacitor 123 is shown in FIG. 4b.

The output voltage of a transistor 122 is supplied to a capacitor 134 through resistances 132, 133, and is charged at the capacitor 134. At this time, if the charged voltage of the capacitor 134 reaches a threshold voltage TH, the charged voltage of the capacitor 134 is discharged to a disabling signal input port through a resistance 133 as the disabling signal Dis of the timer 131 is of low potential. Therefore, a trigger signal of the timer 131 becomes of low potential, after which a switching signal OUT outputted from the timer 131 is triggered to be of high potential. Generation of a switching signal OUT by the timer 131 is shown in FIG. 4c.

Further, the switching signal OUT is supplied to a gate of a switch SCR of an electric power source 10A through a switching signal transmission section 140, and the switch SCR is switched to a turn-on state according to an output voltage of a switching signal transmission section 140. That is, as the switch SCR is switched to a turn-on state, an output voltage of a bridge diode BD is transmitted to cathode through anode of the switch SCR.

An output voltage of the switch SCR is supplied to a capacitor Cin and is smoothed. The output voltage of the capacitor Cin is supplied to the primary winding of a transformer T.

In the meantime, an output voltage of a bridge diode BD is supplied to a control section 50A at which a control signal for allowing flow of a current through the primary winding of a transformer T is generated. The control signal is supplied to a switching section 60A which is switched to a turn-on state accordingly. Then a current flows through the primary winding of a transformer T, and a first secondary winding L21 as well as a second secondary winding L22 of the transformer T are excited.

The excitation voltages of a first secondary winding L21 and a second secondary winding L22 of a transformer T are supplied to diodes Do1, Do2 of a first power supply Section 30 and a second power supply section 40, respectively, and are then subject to half-wave rectification.

Output voltages of diodes Do1, Do2 are supplied to capacitors Co1, Co2, to be smoothed. Then a first load LD1 starts its operation as an output voltage of the capacitor Co1 is supplied to it.

Also, an output voltage of a capacitor Co2 is supplied to a regulator REG to be converted to be a constant voltage. A second load LD2 then starts its operation as an output voltage of the regulatior is supplied to it.

In the meantime, if a synchronizing signal SYN is not supplied to a synchronizing signal detection section 100 of a power economy section 20A, an excitation voltage of a transformer 101 is outputted as of low potential, and a transistor 104 is switched to a turn-off state.

An alternating current AC inputted is supplied to a capacitor 111 of an auxiliary power supply section 110 and is smoothed. An output voltage of the capacitor 111 is supplied to diodes 112, 113 to be rectified.

Output voltages of diodes 112, 113 are supplied to a capacitor 114 and are smoothed. An output voltage of the capacitor 114 is supplied to a Zener diode 115, and is maintained to be a constant voltage.

An output voltage of the capacitor 114 is supplied to a transistor 122 through a resistance 121 of a reset section 120. At this time, as an input signal of the transistor 122 is of high potential, the transistor 122 is switched to a turn-off state. Accordingly, an output terminal of the transistor 122 for driving a timer is of low potential.

Further, an output terminal of the transistor 122 is charge to a capacitor 123. At this time, if the charged potential of the capacitor 123 becomes lower than a threshold voltage, the output signal of the transistor 122 acts as a driving signal RET which is then supplied to a timer 131 when it is of low potential. That is, the driving signal RET is supplied to a timer 131 of an oscillation section 130, and a low-potential switching signal OUT is outputted by the timer 131. As a low-potential switching signal OUT is supplied to a gate of the switch SCR through a switching signal transmission section 140, the switch SCR is switched to a turn-off state.

An output voltage of a bridge diode BD supplied to anode of a switch SCR is not supplied to a capacitor Cin as the switch SCR is switched to a turn-off state. The transformer T in FIG. 2 is not operated, and therefore, a first load LD1 and a second load LD2 are not operated. If no synchronizing signal SYN is inputted, a first load LD1 and a second load LD2 are not operated, and a monitor becomes in an off mode which is a power saving mode.

Next, in FIGS. 5 and 6a–6f, a power economy section 20B is comprised of a synchronizing signal detection section 200 for detecting the presence of a synchronizing signal; an auxiliary power supply section 210 for converting an alternating current AC to a direct current; a reset section 220 for generating a driving signal RET to generate a switching signal according to output voltages of the auxiliary power supply section 210 and the synchronizing signal detection section 200; an oscillation section 230 which is oscillated according to a driving signal RET of the reset section 220 to generate a switching signal OUT; and a switching signal transmission section 240 for transmitting the switching signal OUT of the oscillation section 230 to an electric power source 20B.

Figure 5:
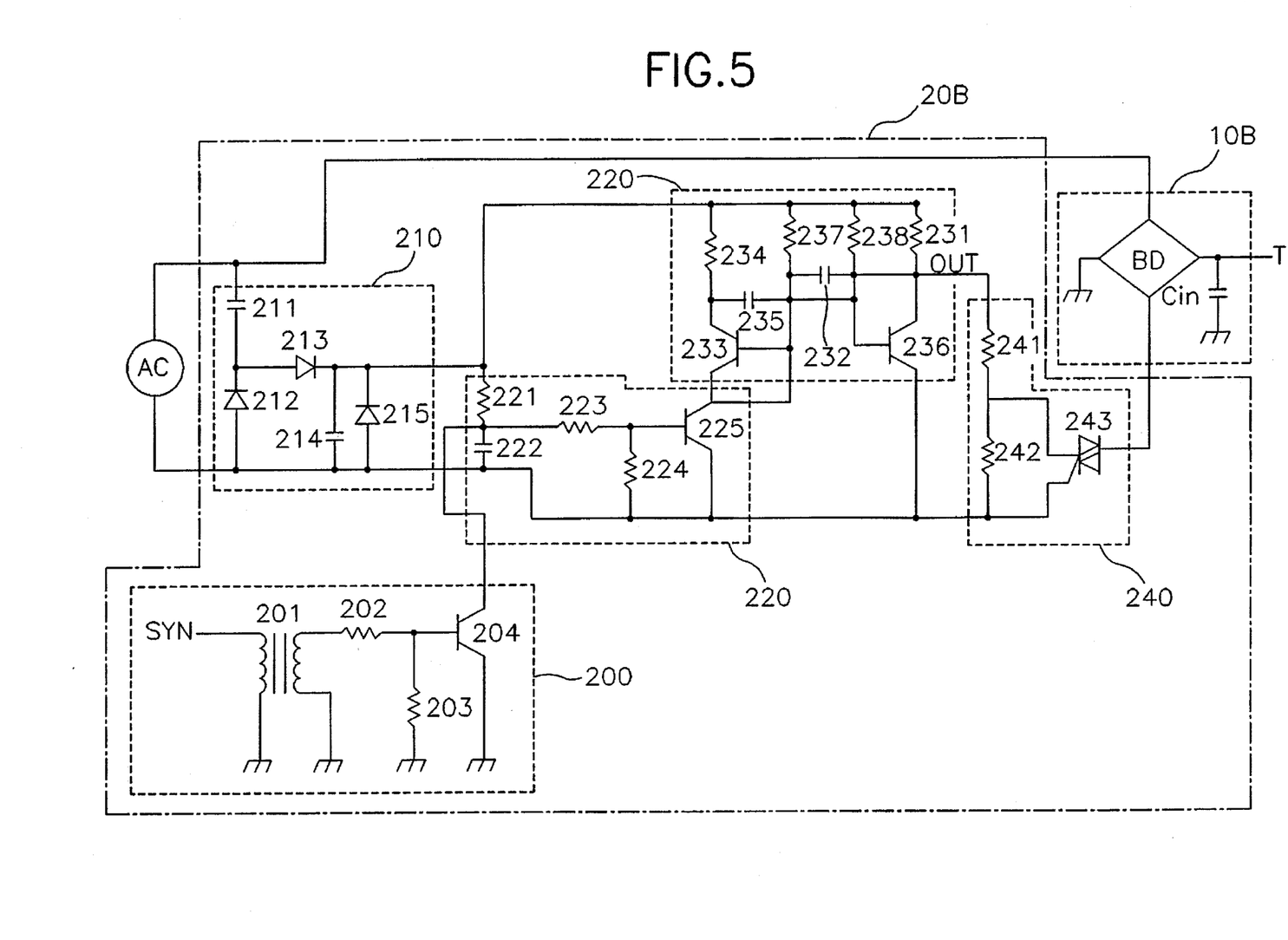
FIG. 5 is a detailed circuit diagram of an electric power source and a power economy section of a power supply device of a monitor manufactured according to a second embodiment of the present invention.

Further, similar to the synchronizing signal detection section 100 in FIG. 2, the synchronizing signal detection section 200 is comprised of a transformer 201, resistances 202, 203, and a transistor 204; and similar to the auxiliary power supply section 110 in FIG. 2, the auxiliary power supply section 210 is comprised of capacitors 211, 214, diodes 212, 213, and a Zener diode 215.

In more detail, to an output terminal of a capacitor 214 of the auxiliary power supply section 210, an input terminal of a resistance 221 for biasing the output voltage of the capacitor 214 is connected; to an output terminal of the resistance 221, one end of a capacitor 222 for charging the output voltage of the resistance 221 is connected; and to another end of the capacitor 222, a collector of the transistor 204 of the synchronizing signal detection section is connected.

Also to one end of the capacitor 222, resistances 223, 224 for distributing the output voltage of the capacitor 222 are connected in parallel; and to the output terminal of the resistance 224, a negative input terminal of an alternating current AC is connected.

To an output terminal of the resistance 223, a base of a transistor 225, for generating a driving signal RET to be switched according to the distribution voltages of resistances 223, 224 to control the operation of an oscillation section 230, is connected. To an emitter of the transistor 225, a negative input terminal of an alternating current AC is connected. And to a collector of the transistor 225, an oscillation section, which is operated according to a driving signal RET of the transistor 225, is connected.

In the meantime, to an output terminal of a capacitor 214, an input terminal of a resistance 231 for biasing an output voltage of the capacitor 214 is connected; and to an output terminal of a resistance 231, one end of a capacitor 232 for charging the output voltage of the resistance 231 is connected. To another end of the capacitor 232, a base of a transistor 233, which is switched according to the charged voltage of the capacitor 232, is connected; to a collector of the transistor 233, an output terminal of a resistance 234 for biasing an output voltage of the capacitor 214 is connected; and to an emitter of the transistor 233, a negative input terminal of an alternating current AC is connected.

Also, to an output terminal of a resistance 234, one end of a capacitor 235 for charging an output voltage of the resistance 234 is connected; to another end of the capacitor, a base of a transistor 236, which is switched according to an output voltage of the capacitor 235, is connected; and to a collector of the transistor 236, an output terminal of the resistance 231 is connected. To other ends of the capacitor 232 and the capacitor 235, output terminals of resistances 237, 238 for biasing output voltages of the capacitor 214 are connected.

Further, to a collector of a transistor 236, input terminals of resistances 241, 242 of a switching signal transmission section 240 for transmitting a switching signal OUT outputted from the transistor 236 are connected. Resistances 241, 242 are connected in series between the collector of the transistor 236 and a negative input terminal of an alternating current AC. To an output terminal of the resistance 241, a gate of a triac 243 is connected. The triac 243 is switched according to an output voltage of the resistance 241 to supply an alternating current AC to an electric power source 20.

To a positive input terminal of an alternating current AC and an output terminal of a bridge diode BD of an electric power source 10B for full-wave rectification of the alternating current AC supplied from a power economy section 20B, one end of a capacitor Cin for smoothing an output voltage of the bridge diode BD and supplying it to a primary winding of a transformer T is connected.

FIGS. 6a–6f show the operation of a synchronizing signal detection section 200 and an auxiliary power supply section 210 of a power economy section 20B which is the same as described above.

Figure 6A:
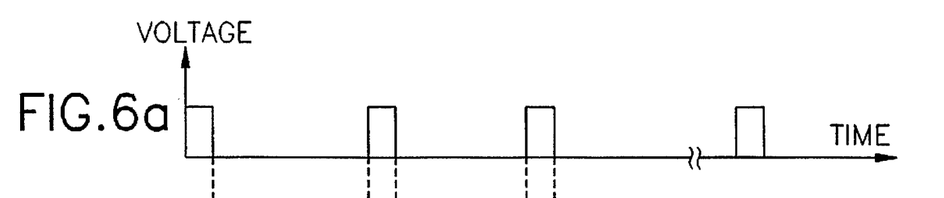
FIGS. 6a–6f are wave form diagrams of output signals of each section of FIG. 5.
Figure 6B:
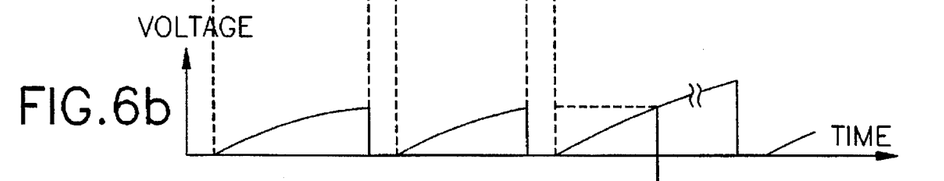
Figure 6C:
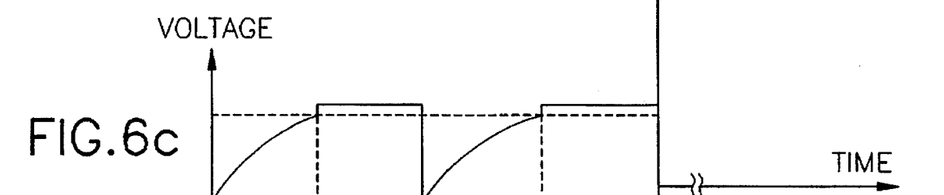
Figure 6D:
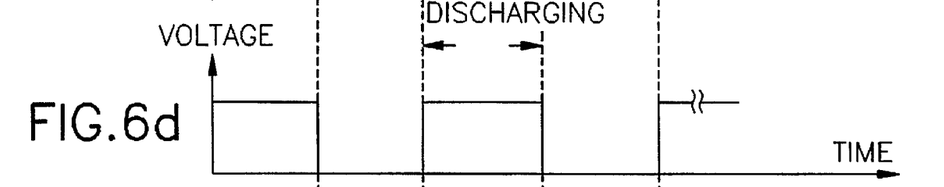
Figure 6E:
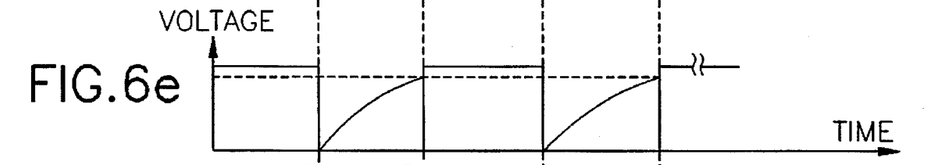
Figure 6F:
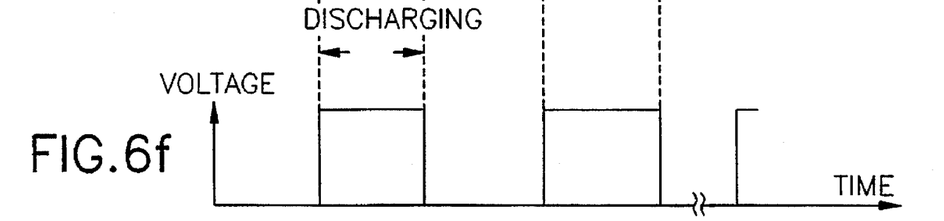

As shown in FIG. 6a, if a synchronizing signal SYN is inputted from outside, a transistor 204 of a synchronizing signal detection section is switched to a turn-on state. An output voltage of an auxiliary power supply section is charged to a capacitor 222 through a resistances 221 of a reset section 220 as shown in FIG. 6b. The charged voltage of the capacitor 222 is discharged through the transistor 204. Then the charged voltage of the capacitor 222 is lowered and distributed by resistances 223, 224. The distribution voltages of resistances 223, 224 are supplied to a transistor 225 which is switched to a turn-off state. An output voltage of a capacitor 214 is supplied to an oscillation section which is then operated. That is, an output voltage of the capacitor 214 is supplied to a capacitor 232 through a resistance 231 of an oscillation section 230 to be charged as shown in FIG. 6c. A transistor 233 is switched to a turn-on state according to the charged voltage of the capacitor 232. At this time, an electric potential of the collector of the transistor 233 is shown in FIG. 6d. It is lowered as the transistor 233 is switched to a turn-on state. An output voltage of a capacitor 214 is supplied to a capacitor 235 through a resistance 238 to be charged as shown in FIG. 6e. A transistor 236 is switched to a turn-on state according to the charged voltage of the capacitor 235, and thus an electric potential of the collector of the transistor 236 is lowered. An output voltage of the capacitor 214 is supplied to a capacitor 232 to be charged. The transistor 236 outputs a pulse-form switching signal OUT as shown in FIG. 6f. The switching Signal OUT is then supplied to resistances 241, 242 of a switching signal transmission section 240 to be biased. A triac 243 is switched to a turn-on state according to an output voltage of the resistance 241.

A negative alternating current AC outputted from the resistance 242 is supplied to an electric power source 10B through a triac 243. A positive alternating current AC and a negative alternating current AC supplied through a triac 243 are supplied to a bridge diode BD of an electric power source 10B to be rectified. An output voltage of a bridge diode is supplied to a capacitor Cin to be smoothed. An output voltage of the capacitor Cin is supplied to a primary winding of a transformer T.

An excitation voltage of a first secondary winding L21 of the transformer T is supplied to a first power supply section 30B to be half-wave-rectified and smoothed. An output voltage of a first power supply section 30B is supplied to a first load LD1 which is then operated.

An excitation voltage of a second secondary winding L22 of a transformer is supplied to a second power supply section 40B to be smoothed and converted to be a constant voltage. An output voltage of a second power supply section 40B is supplied to a second load LD2 which is then operated.

In the meantime, if a synchronizing signal SYN is not inputted, a transistor 204 is switched to a turn-off state, while a transistor 225 is switched to a turn-on state as the charged voltage of a capacitor 222 of a reset section 220 is supplied to the transistor 225 through resistances 223, 224.

An output voltage of a capacitor 214 outputted from an auxiliary power supply section is supplied to a capacitor 232 through a resistance 231 of an oscillation section and is charged. A charged voltage of the capacitor 232 is supplied to an emitter of a transistor 225 as the transistor 225 is switched to a turn-on state.

Therefore, a transistor 233 is switched to a turn-off state according to a charged voltage of a capacitor 232, and this situation is maintained until a synchronizing signal is inputted again. However, an output voltage of a capacitor 214 is supplied to a base of a transistor 236 which is switched to a turn-on state accordingly. This situation is maintained until a transistor 233 is switched to a turn-on state again. Therefore, a transistor 236 outputs a switching signal of low potential.

A switching signal OUT is supplied to a triac 243 through a resistance 241 of a switching signal transmission section. As the triac 243 is switched to a turn-off state, it does not output a negative alternating current Ac outputted from a resistance 242. A bridge diode BD, a capacitor Cin, and a transformer T are not operated, and thus, a first load LD1 and a second load LD2 are not operated.

Figure 7:
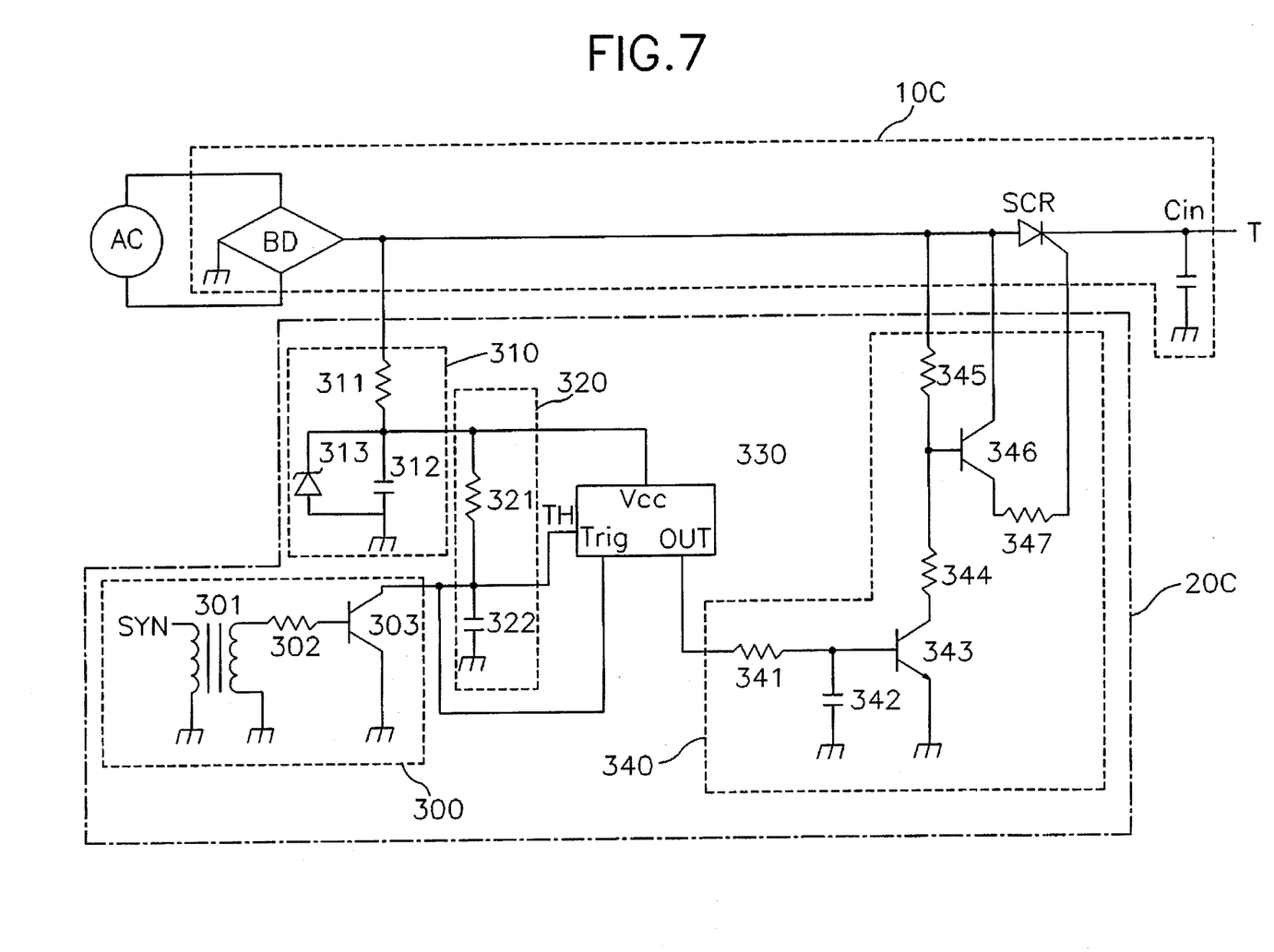
FIG. 7 is a detailed circuit diagram of an electric power source and a power economy section of a power supply device of a monitor manufactured according to a third embodiment of the present invention.

In FIGS. 7 and 8, an electric power source 10C is comprised of a bridge diode BD, a switch SCR, and a capacitor Cin as the electric power source 10A in FIG. 2.

However, a power economy section 20C is comprised of a synchronizing signal detection section 300 for detecting the presence of a synchronizing signal SYN inputted, an auxiliary power supply section 310 for converting an output voltage of a bridge diode BD of an electric power source 10C to a direct voltage, a reset section 320 for generating a driving signal RET to generate a switching signal according to an output voltage of the auxiliary power supply section 310 and an output signal of a synchronizing signal detection section 300, an oscillation section 330 which is oscillated according to a driving signal RET and generates a switching signal, a switching signal transmission section 540 for transmitting a switching signal OUT of the oscillation section to a switch SCR of an eletric power source 20C.

A synchronizing signal detection section 300 is comprised of a transformer 301, a resistance 302, and a transistor 303 as the synchronizing signal detection section 100 in FIG. 3.

To an output terminal of a resistance 311 for biasing an output voltage of a bridge diode, one end of a capacitor 312 for charging the output voltage of the resistance 311 is connected, and to one end of the capacitor 312, cathode of a Zener diode 313 for maintaining the output voltage of the capacitor 312 is connected. Another end of the capacitor 312 and anode of the Zener diode 313 are connected to earth.

To an output terminal of the capacitor 312, an input terminal of a resistance 321 of a reset section 320 for biasing the output voltage of the capacitor 312 is connected; to an output terminal of the resistance 321, one end of the capacitor 322 for charging an output voltage of the resistance 321 is connected; and to one end of the capacitor 322, a threshold voltage input port of an oscillation section which is oscillated according to an output voltage of the capacitor 322 and generates a switching signal OUT is connected.

To an output terminal of a transistor 303 of a synchronizing signal detection section 11C, a timer triggering input port of an oscillation section 330 is connected; and to one end of the capacitor 312, a power source input port of an oscillation section 330 is connected. The oscillation section 330 is comprised of a one-shot vibrator which generates one pulse.

Further, to an output terminal of an oscillation section 330, an input terminal of a resistance 341 of a switching signal transmission section for biasing a switching signal OUT is connected; to an output terminal of the resistance 341, one end of a capacitor 342 for smoothing the output voltage of the resistance 341 is connected; to one end of a capacitor 342, a base of a transistor 343 which is switched according to an output voltage of the capacitor is connected; and an emitter of the transistor 343 is connected to earth. To a collector of a transistor 343, an output terminal of a resistance 344 for controlling the output current of the transistor 343 is connected.

In the meantime, to an output terminal of a bridge diode BD, an input terminal of a resistance 345 for biasing the output voltage of the bridge diode BD is connected; and to an output terminal of a resistance 345, a base of a transistor 346, which is switched according to an output voltage of the resistance 345, as well as an input terminal of a resistance 344, are connected.

To an emitter of the transistor 346, an output terminal of a bridge diode BD is connected; and to a collector of the transistor 346, an output terminal of a resistance 347 for biasing the output voltage of the transistor 346 is connected. To an output terminal of the resistance 347, a gate terminal of a switch SCR of an electric power source 20C is connected. To an output terminal of the switch SCR, one end of a capacitor Cin for smoothing the output voltage of the bridge diode is connected.

FIGS. 8a–8d show how a power supply device of a monitor is operated.

An alternating current AC inputted through a positive input terminal and a negative input terminal is supplied to a bridge diode BD of an electric power source, and is subject to full-wave rectification.

Figure 8A:
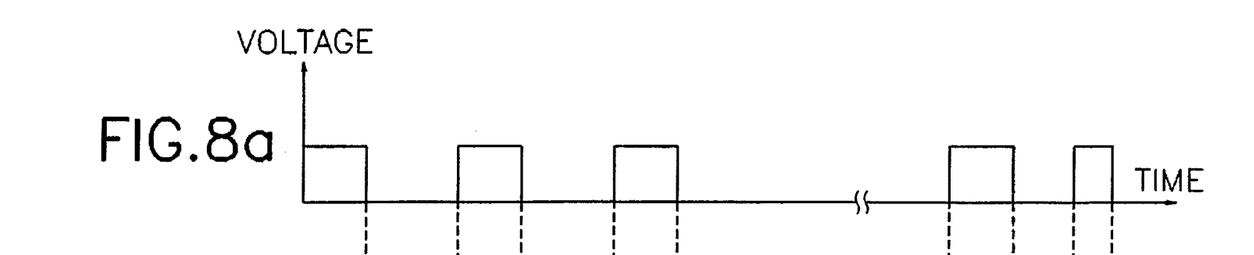
FIGS. 8a–8d are wave form diagrams of output signals of each section of FIG. 7.

In the meantime, as shown in FIG. 8a, once a synchronizing signal SYN is supplied to a synchronizing signal detection section 300 of a power economy section 20C, a transformer 301 is operated. An excitation voltage of the resistance 302 is then supplied to and passes through a resistance 302. An output voltage of the resistance 302 is supplied to a base of a transistor 303 which is switched to a turn-on state accordingly.

Under this circumstance, an output voltage of a bridge diode BD is supplied to an auxiliary power supply section 310, and is rectified. That is, an output voltage of the bridge diode BD is supplied to a capacitor 312 through a resistance 311 of the auxiliary power supply section 310; and the output voltage of the resistance 311 is charged at the capacitor 312.

Figure 8B:
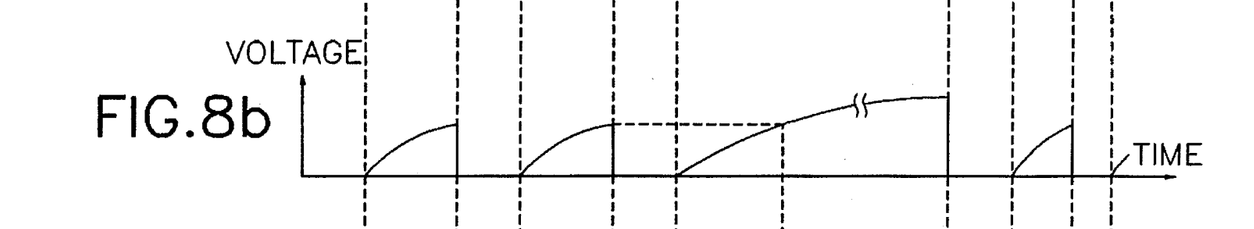

The output voltage of the capacitor 312 is supplied to a Zener diode 313 which maintains the charged voltage to be a constant voltage. The output voltage of the capacitor 312 is supplied to an oscillation section 330 through a power input port; and a switching signal OUT is generated at the oscillation section 330. An output voltage of the capacitor 312 is supplied to a capacitor 322 through a resistance 321 of a reset section 320; and the output voltage of a resistance 321 is charged at the capacitor 322 as shown in FIG. 8b.

However, as a transistor 303 of a synchronizing signal detection section 300 is switched to a turn-on state, the charged voltage of the capacitor 322 is supplied to earth through the transistor 303. If the charged voltage of the capacitor 322 is higher than the threshold voltage, it is charged through a transistor 303 and becomes of low potential. It is then supplied to an oscillation section 330 through a trigger signal input port.

Figure 8C:
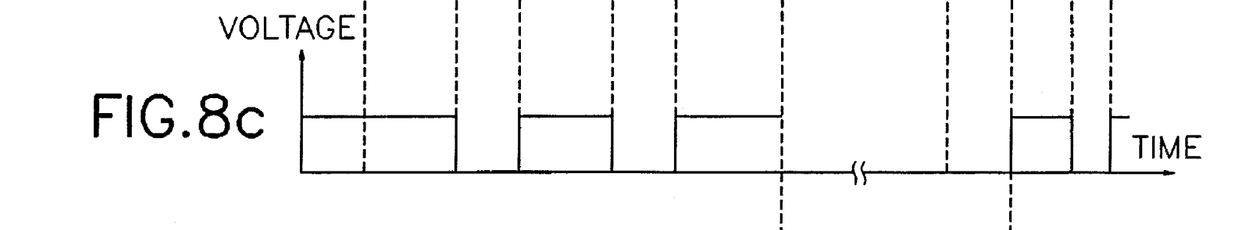
Figure 8D:
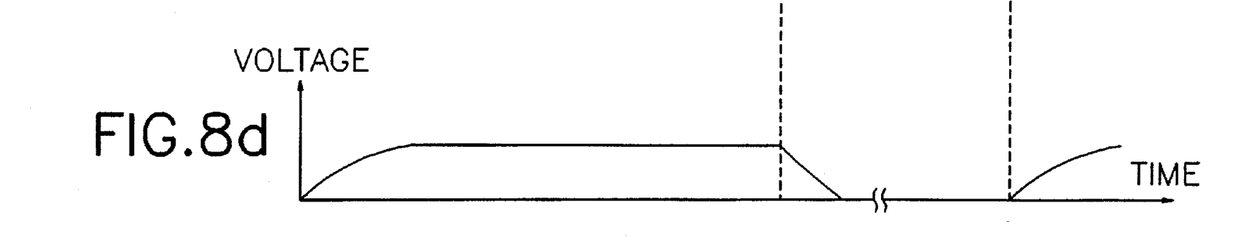

As shown in FIG. 8c, a switching signal OUT outputted from the oscillation section 330 is triggered from a low-potential state to a high-potential state. The switching signal OUT is supplied to a capacitor 342 through a resistance 341 of a switching signal transmission section 340, and is charged. The charged voltage of the capacitor 342 is then supplied to a base of a transistor 343 as shown in FIG. 8d. That is, as the output voltage of the capacitor 342 is of high potential, the transistor 343 is switched to a turn-on state. And further, as the transistor 343 is switched to a turn-on state, an output voltage of a bridge diode BD is supplied to an emitter of the transistor 343 through resistances 344, 345, and is supplied to earth.

An output voltage of the resistance 345 becomes of low potential, and is supplied to a base of a transistor 346 which is then switched to a turn-on state. As the transistor 346 is switched to a turn-on state, an electric potential of an emitter of the transistor 346 is supplied to a collector. Therefore, the electric potential of an emitter of the transistor is an output voltage of a bridge diode BD. As an electric potential of a collector of the transistor 346 is supplied to a gate of a switch SCR of an electric power source 20C through a resistance 347, a switch SCR is switched to a turn-on state.

An output voltage of a bridge diode BD is supplied to a capacitor Cin through the switch SCR. An output voltage of the switch SCR is smoothed at the capacitor Cin. The output voltage of the capacitor Cin is then supplied to a primary winding of a transformer T. If a synchronizing signal SYN is not inputted for some time, a transformer 301 is not operated, and a transistor 303 is switched to a turn-off state.

An output voltage of a bridge diode BD is supplied to an auxiliary power supply section 310, and is rectified. That is, an output voltage of the bridge diode BD is supplied to a capacitor 312 through a resistance 311 of the auxiliary power supply section 310, and an output voltage of the resistance 311 is charged at the capacitor 312.

An output voltage of the capacitor 312 is supplied to a Zener diode 313 which maintains the charged voltage of the capacitor 312 to be a constant voltage. An output voltage of the capacitor 312 is supplied to an oscillation section 330 through a power input port as well as is supplied to a capacitor 322 through a resistance 321 of a reset section 320, an output voltage of the resistance 321 is charged at the capacitor 322. The charged voltage of the capacitor 322 is supplied to an oscillation section 330 through a trigger signal input port.

As the charged voltage of the capacitor 322 becomes higher than a threshold voltage and a transistor 303 is switched to a turn-off state, a trigger signal becomes of high potential and is supplied to an oscillation section 330 through an input port. Therefore, a switching signal OUT generated from the oscillation section 330 is triggered from a high-potential state to a low-potential state.

Further, a switching signal OUT is supplied through a capacitor 342 through a resistance 341 of a switching signal transmission section 340, and is charged. The charged voltage of the capacitor 342 is supplied to a base of a transistor 343. That is, as an output voltage of the capacitor 342 is of low potential, the transistor 343 is switched to a turn-off state, and an output voltage of a bridge diode is supplied to the base of a transistor 346 through a resistance 345. At this time, as an output voltage of the resistance 345 is of high potential, the transistor 346 is switched to a turn-off state. As the transistor 346 is switched to a turn-off state, an electric potential of a collector of the transistor 346 becomes of low potential and is supplied to a gate of a switch SCR of an electric power source 20C through a resistance 347. Therefore, the switch SCR is switched to a turn-off state.

Under this circumstance, as an output voltage of a bridge diode BD is not supplied to a capacitor Cin through a switch SCR, a transformer T in FIG. 2 is not operated. Then a first load LD1 and a second load LD2 are not operated, and the monitor becomes in an off mode.

When a power supply device of the present invention is used, the operation of a transformer is stopped when a monitor is in an off mode, and therefore, the second load does not have to be in operation. In this manner, the power necessary for driving the second load can be prevented from being consumed.

While the invention has been described in terms of preferred embodiments, those skilled in the art will recognize that the invention can be practiced with modification within the spirit and scope of the appended claims. For example, an electric power supply device is for a monitor in the present invention, however, it can be used generally as any power supply device.

What is claimed is:

1. An electric power supply device for a monitor, comprising:

an electric power input means including a bridge diode for outputting a first signal by full-wave-rectifying an alternate electric signal supplied from the external, a switch for switching to pass the first signal, and a capacitor for rectifying the first signal of the switch and supplying the rectified first signal to a primary winding of a transformer;

an electric power economy means for generating a switching signal in order to control the switch according to presence or non-presence of a synchronizing signal inputted from the external, and for preventing the transformer from being operated by switching the switch to a turn-off state during an off-mode of the monitor; and an electric power supplying means for half-wave-rectifying an induced signal of one or more secondary windings of the transformer, and for stablizing the half-wave-rectified induced signal to supply the stablized half-wave-rectified induced signal to one or more loads.

2. The electric power supply device as claimed in claim 1, wherein the electric power economy means has:

a synchronizing signal detection means for detecting presence or non-presence of the synchronizing signal;

means for converting the alternate electric signal inputted from the external to a direct voltage signal;

a reset means for generating a driving signal to output the switching signal according to an output signal of the synchronizing signal detection means and the direct voltage signal of the converting means; and an oscillating means for generating the switching signal to control the switch of the electric power input means with an oscillation according to the driving signal of the reset means.

3. The electric power supply device as claimed in claim 2, wherein the oscillating means is a multivibrator for generating a plurality of switching signals according to the driving signal of the reset means and the direct voltage signal of the converting means.

4. The electric power supply device as claimed in claim 2, further comprising a switching signal transmitting means for transmitting the switching signal of the oscillating means to the switch.

5. The electric power supply device as claimed in claim 4, wherein the switching signal transmitting means is a transformer for transmitting the switching signal of the oscillating means from a primary winding of the transformer to a secondary winding of the transformer.

6. The electric power supply device as claimed in claim 1, wherein the switch of the electric power input means is a thyrister, and the thyrister is switched according to the switching signal inputted to a gate thereof to supply the first signal of the bridge diode to the capacitor.

7. An electric power supply device for a monitor, comprising:

an electric power input means including a bridge diode for outputting a first signal by full-wave-rectifying an alternate electric signal supplied from the external, and a capacitor for rectifying the first signal of the bridge diode and supplying the rectified first signal to a primary winding of a transformer;

an electric power economy means for supplying negative components of the alternate electric signal according to presence or non-presence of a synchronizing signal inputted from the external; and an electric power supplying means for half-wave-rectifying induced signals of one or more secondary windings of the transformer, and for stablizing the half-wave-rectified induced signal to supply the stablized half-wave-rectified induced signal to one or more loads.

8. The electric power supply device as claimed in claim 7, wherein the electric power economy means has: a synchronizing signal detection means for detecting presence or non-presence of the synchronizing signal;

means for converting the alternate electric signal inputted from the external to a direct voltage signal;

a reset means for generating a driving signal to output the switching signal according to an output signal of the synchronizing signal detection means and the direct voltage signal of the converting means;

an oscillating means for generating the switching signal to control the switch of the electric power input means with an oscillation according to the driving signal of the reset means; and a switching signal transmitting means for transmitting the negative components of the alternate electric signal to the bridge diode by controlling the switch according to the switching signal of the oscillating means.

9. The electric power supply device as claimed in claim 8, wherein the oscillating means has:

a first resistor for biasing the direct voltage signal of the converting means;

a first capacitor for charging the direct voltage signal of the first resistor;

a first transistor which is switched according to the charged voltage of the first capacitor;

a second resistor for biasing the direct voltage signal of the converting means according to a switching state of the first transistor;

a second capacitor for charging a voltage of the second resistor; and a second transistor which is switched according to the charged voltage of the second capacitor.

10. The electric power supply device as claimed in claim 8, wherein the switching signal transmitting means has:

a third resistor for biasing the switching signal of the oscillating means;

a fourth resister for biasing an output signal of the third resistor to an alternate electric power negative component input terminal; and a triac for supplying an output voltage of the fourth resistor to the bridge diode by being switched according to the output of the third resistor.

11. An electric power supply device for a monitor, comprising:

an electric power input means including a bridge diode for outputting a first signal by full-wave-rectifying an alternate electric signal supplied from the external, a switch for switching to pass the first signal, and a capacitor for rectifying the first signal of the bridge diode and supplying the rectified first signal to a primary winding of a transformer;

an electric power economy means for generating a switching signal to control the switch according to the first output and presence or non-presence of a synchronizing signal inputted from the external, and for preventing the transformer from being operated by switching the switch to a turn-off state during an off-mode of the monitor; and an electric power supplying means for half-wave-rectifying an induced signal of one or more secondary windings of the transformer, and for stabilizing the half-wave-rectified induced signal to supply the stabilized half-wave-rectified induced signal to one or more loads.

12. The electric power supply device as claimed in claim 11, wherein the electric power economy means has:

a synchronizing signal detection means for detecting presence or non-presence of the synchronizing signal suppled from the external;

means for stabilizing the first signal;

a reset means for generating a trigger signal to trigger the switching signal according to an output signal of the synchronizing signal detection means and an output signal of the stabilizing means; and an oscillating means for generating the switching signal to control the switch of the electric power input means with an oscillation according to the trigger signal of the reset means.

13. The electric power supply device as claimed in claim 12, wherein the oscillating means is a vibrator for generating a switching signal according to the trigger signal and the output signal of the conversion means.

14. The electric power supply device as claimed in claim 11, further comprising a switching signal transmitting means for transmitting the switching signal of the oscillating means.

15. The electric power supply device as claimed in claim 14, wherein the switching signal transmitting means has:

a fifth resistor for biasing the switching signal of the oscillating means;

a third capacitor for charging an output signal of the fifth resistor;

a third transistor which is switched according to an output signal of the third capacitor;

a sixth resistor for controlling an output signal of the third transistor according to a switching state of the third transistor;

a seventh resistor for biasing the first signal to the sixth resistor according to a switching state of the third transistor;

a fourth transistor for passing the first signal by being switched according to the seventh resistor; and an eighth resistor for biasing an output signal of the fourth transistor to a gate of the switch.

* * * * *